(12) United States Patent
Chen

(10) Patent No.: US 10,117,313 B2
(45) Date of Patent: *Oct. 30, 2018

(54) SENSING LAMP AND SENSING MODULE THEREOF

(71) Applicant: Chia-Teh Chen, Taipei (TW)

(72) Inventor: Chia-Teh Chen, Taipei (TW)

(73) Assignee: VAXCEL INTERNATIONAL CO., LTD., Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,616

(22) Filed: Dec. 12, 2016

(65) Prior Publication Data

US 2017/0094752 A1 Mar. 30, 2017

Related U.S. Application Data

(63) Continuation-in-part of application No. 14/828,373, filed on Aug. 17, 2015, now Pat. No. 9,551,481.

(51) Int. Cl.
| | |
|---|---|
| *H05B 37/02* | (2006.01) |
| *H05B 33/08* | (2006.01) |
| *F21S 8/00* | (2006.01) |
| *F21V 23/04* | (2006.01) |
| *H05B 33/00* | (2006.01) |
| *F21V 23/00* | (2015.01) |
| *F21S 8/08* | (2006.01) |

(Continued)

(52) U.S. Cl.
CPC .......... *H05B 37/0227* (2013.01); *F21S 8/033* (2013.01); *F21V 23/0442* (2013.01); *H05B 33/00* (2013.01); *H05B 33/0842* (2013.01); *F21S 8/08* (2013.01); *F21S 8/088* (2013.01); *F21V 23/001* (2013.01); *F21V 23/0464* (2013.01); *F21V 23/0471* (2013.01); *F21V 31/00* (2013.01); *F21W 2131/10* (2013.01); *F21Y 2115/10* (2016.08); *H01R 33/9453* (2013.01)

(58) Field of Classification Search
CPC .... F21V 21/14; F21V 23/001; F21V 23/0471; F21S 8/08
See application file for complete search history.

(56) References Cited

U.S. PATENT DOCUMENTS

| 8,063,375 B2 * | 11/2011 | Cobbinah | ............ A61B 5/1113 |
| | | | 250/338.3 |
| 2009/0168412 A1 * | 7/2009 | Murphy | .................. F21L 4/045 |
| | | | 362/202 |

(Continued)

*Primary Examiner* — Douglas W Owens
*Assistant Examiner* — Pedro C Fernandez
(74) *Attorney, Agent, or Firm* — Li & Cai Intellectual Property (USA) Office

(57) ABSTRACT

A sensing module detachably connectable to a light body includes a sensing unit and a connecting module. The sensing unit has at least one sensor, a control circuit and at least one parameter adjusting element. The sensor and the parameter adjusting element are electrically coupled to the control circuit, and the sensing module is electrically coupled and mechanically mounting to the light body via the connecting module. The sensing module further includes a socket allowing a light source to be connected to the sensing module. The sensing module can also include a light source. The user can manipulate the illumination characteristic through the sensing module.

15 Claims, 16 Drawing Sheets

(51) Int. Cl.
　　　*F21V 31/00*　　　(2006.01)
　　　*F21Y 115/10*　　　(2016.01)
　　　*F21W 131/10*　　　(2006.01)
　　　*H01R 33/945*　　　(2006.01)

(56) References Cited

U.S. PATENT DOCUMENTS

2009/0251058 A1* 10/2009 Chen ............... H05B 37/0218
　　　　　　　　　　　　　　　　　　　　　315/159
2011/0284730 A1* 11/2011 Sturdevant ........ H05B 37/0218
　　　　　　　　　　　　　　　　　　　　　250/252.1
2014/0268881 A1* 9/2014 Ku ..................... F21V 23/0464
　　　　　　　　　　　　　　　　　　　　　362/642

* cited by examiner

SENSING LAMP AND SENSING MODULE THEREOF

CROSS REFERENCE TO RELATED APPLICATIONS

This Application is a Continuation-in-Part of application Ser. No. 14/828,373, filed Aug. 17, 2015, now pending, and entitled SENSING LAMP.

BACKGROUND OF THE INVENTION

1. Field of the Invention

The present disclosure relates to lighting; in particular, to a sensing module of a sensing lamp.

2. Description of Related Art

A conventional wall lamp is illustrated in FIG. 1A. For considering the design of the structure's appearance, the conventional wall lamp 1 can be divided into a light body 11 and a back plate 12. The shape of the light body 11 is designed according to the requirement of the user. The back plate 12 is used for installing the wall lamp to a wall. Today, the lighting requirement for the user varies due to the user's presence; therefore the technology of sensing light has been developed. Utilizing a sensor for sensing the environment (environment light or the user activity), the sensing lamp can turn off the light source when the light is not required. For example, the wall lamp shown in FIG. 1A can be added with a sensor 111. The sensor 111 usually is a light sensor or a motion sensor. When the sensor 111 of the wall lamp senses that the environment light is not enough or the user is approaching, the sensor 111 can turn on the light.

Conventionally, the sensor and the control circuit of the wall lamp are individually arranged. As shown in FIG. 1A, the sensor 111 can be disposed on the top (or the bottom) of the light body 11. The designed position of the sensor 111 is for obtaining a more accurate sensing result or larger sensing range. Besides, the location of the sensor 111 shown in FIG. 1A may be designed to different positions. For example, referring to the conventional wall lamp 1' shown in FIG. 1B, the sensor 122 is disposed on the back plate 12', and the parameter adjusting element 121' is disposed at the bottom of the back plate 12'.

Referring to FIG. 1A again, the control circuit (not shown in FIG. 1A) connecting the sensor 111 is usually disposed in the back plate 12. In order to let the user easily adjust the related parameter of the sensor 111 such as the sensitivity, brightness or time of the light mode, or the start time of turning on the light, the parameter adjusting element(s) (for example, the switch or knob) is (are) exposed on the surface (for example, bottom surface or side surface) of the back plate 12. That is, the design of the back plate 12 has to fit in with the wiring and switching element (or adjusting element) of the control circuit, and the appearance design of the back plate 12 is so restricted accordingly. Taking FIG. 1A as an example, two parameter adjusting elements 121 are disposed at the bottom surface of the back plate 12. The user can manipulate the parameter adjusting elements to adjust the light mode or lighting parameters of the sensing wall lamp. In the same way, the parameter adjusting element 121' shown in FIG. 1B is disposed at the bottom of the back plate 12'. Because the parameter adjusting elements are usually located at the bottom of the back 12', it cannot accord with user-friendly adjustment, and the design flexibility of the back plate is limited.

Please refer to FIG. 2 showing a block diagram of a conventional sensing wall lamp. The control circuit 13 receives exterior electrical power, and the control circuit 13 is electrically coupled to the light source 110 (disposed in the light body 11 shown in FIG. 1), the sensor 111 and the parameter adjusting element 121. However, referring to FIG. 3, based on the circumstance of arranging the sensor 111 and the corresponding circuit 13 separately and individually, a plurality of conducting wires (for example the two conducting wires 131 shown in FIG. 3) for connecting the sensor 111 and the control circuit 13 may be required, according to the complexity of the sensor 111 (or the types of the adjusted parameters of the wall lamp). Furthermore, the power wires of the light source 110 in the light body 11 and the control wires 133 of the parameter adjusting elements 121 lead to complicated wiring of the elements in the lamp. As such, the related cost of production of the lamp product and the probability of defects resulting during the production process would be increased.

Refer to FIG. 2A, showing a block diagram of another conventional sensing wall lamp. A conventional wall lamp 6 includes a light base 60 and a light source 610 that is detachably connected to the light base 60. The light base 60 has a light body 61 and a sensing module 62. The sensing module 62 can include a sensor and a parameter adjusting element. The sensing module 62 is usually equipped in and connected structurally to the light body 61, and it is non-detachably fixed inside of the sensing wall lamp. Another conventional wall lamp with sensing feature is a regular wall lamp equipped with a separated sensing module.

The non-detachably fixed sensing module lacks of usability for parameter adjustment while the independently located sensing module always require separated power supply and wiring.

Further, conventionally the sensing module appears to be part of outlined design of a sensing lamp. This very much limits the industrial design of a sensing lamp. A sensing lamp may have some restriction in decoration design while a decoration lamp is not easily converted to be with a sensing feature.

SUMMARY OF THE INVENTION

One of the objects of the present disclosure is to provide a detachable sensing module for being easily installed and used with a sensing lamp. Moreover to provide a detachably sensing module for easily installed (usually detachably attached with light source) in side of a lamp so that the outlined design is not limited. The sensing module can further include a light source. The integrated sensing module provides many advantages to consumers: Easy installation and parameter adjustment, flexible in lamp design and one device for sensing, adjustment and lighting functions.

In order to achieve the aforementioned objects, according to an embodiment of the present disclosure, a sensing module is provided. A sensing module, detachably connectable to a light body, the sensing module comprising: a sensing unit, having at least one sensor, a control circuit and at least one parameter adjusting element, the sensor and the parameter adjusting element electrically coupled to the control circuit, the control circuit disposed in the sensing unit; and a connecting module electrically coupled and mechanically connected with the sensing unit; wherein the connecting module is detachably connectable to the light body.

In one embodiment, the connecting module is constructed as an electrical connector to comprise a screw-in base disposed on the top of the sensing module and a screw-in socket disposed under the sensing module, wherein the screw-in base allows the sensing module electrically connectable with the light body; wherein the screw-in socket allows a screw-in light source connectable to the sensing module. The screw-in base and socket are only example. It could be other type of socket such as bi-pin or GU24.

In order to achieve the aforementioned objects, according to an embodiment of the present disclosure, a sensing module is provided. A sensing module, detachably connectable to a light body, the sensing module comprising: a sensing unit, having at least one sensor, a control circuit and at least one parameter adjusting element, the sensor and the parameter adjusting element electrically coupled to the control circuit, a light source, being capable to be turned on or adjusted illumination characteristics by the sensing unit selectively; and a housing, wherein the sensing unit and the light source are assembled with the housing In one embodiment, the housing further comprises a screw-in base disposed on top of the housing, wherein the screw-in base allows the sensing module electrically connectable with the light body. The screw-in base is only an example, the connection may be others such as bi-pin or GU24 connectors.

In summary, a sensing lamp is provided, in which the sensor and the control circuit are integrated into the sensing module. As such, the wiring layout is simple, the arrangement of control wires or power wires is simplified, and the related cost of production of the lamp product and the probability of defects resulting during production process can be reduced. The sensing lamp is provided with a user-friendly way for adjustment and a more concise and aesthetic appearance (the parameter adjusting element is concealed). By utilizing the rotatable sensing unit of the sensing lamp, the user can easily rotate the sensing unit to an angle (the second angle) adapted for operating the parameter adjusting element(s), so as to adjust the related parameter of the sensing unit. After the adjustment is finished, the sensing unit can return to the normal operation angle (the first angle). Because the back plate of the sensing lamp is not restricted to be incorporated with the parameter adjusting element(s), the design flexibility is significantly increased when considering matching the back plate to the aesthetic appearance of the overall light body.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

An Embodiment of the Sensing Lamp

Figure 4:
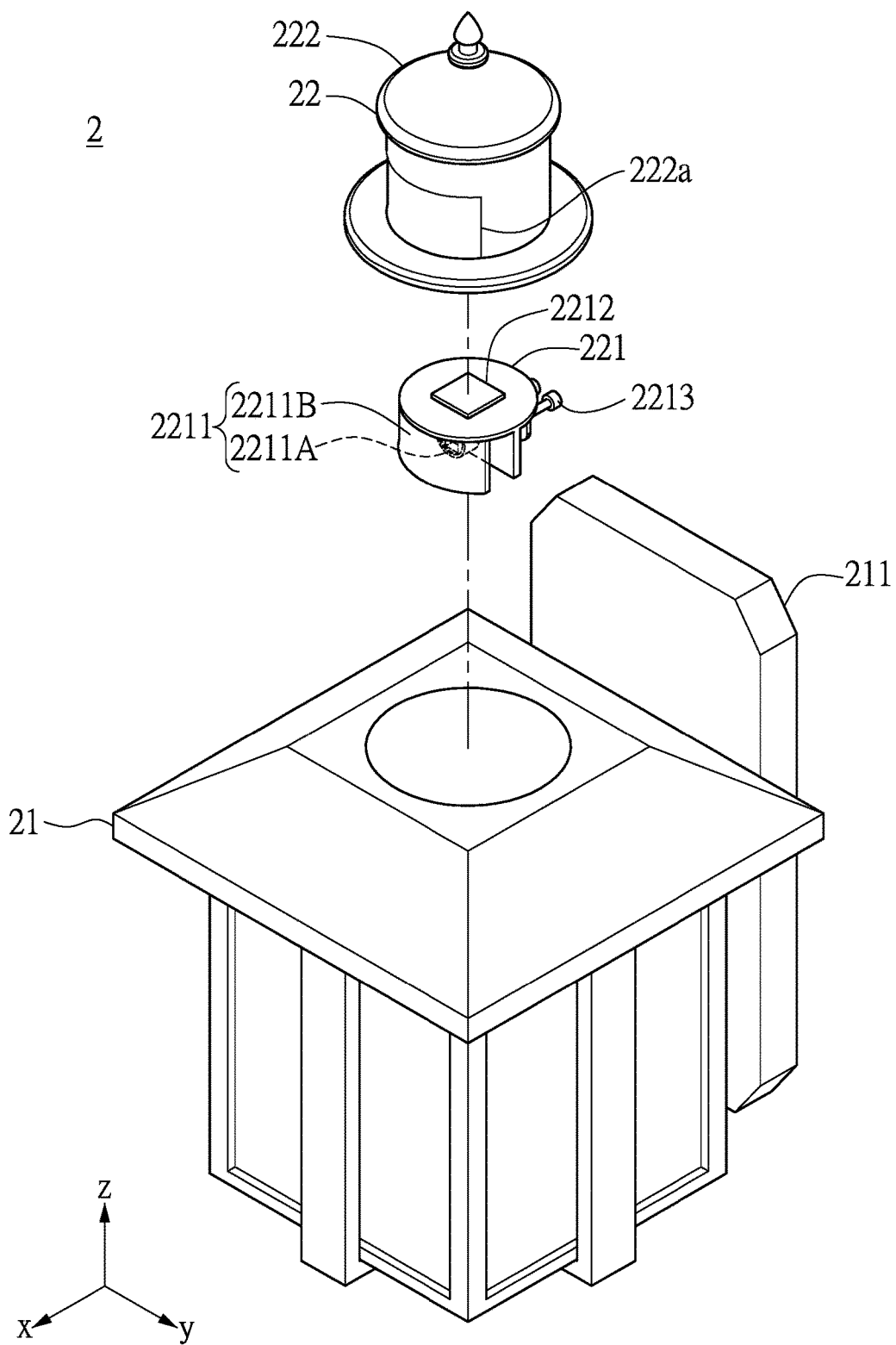
FIG. 4 shows an exploded view drawing of a sensing lamp according to an embodiment of the present disclosure.

Please refer to FIG. 4 showing an exploded view drawing of a sensing lamp according to an embodiment of the present disclosure. The sensing lamp 2 comprises a light body 21 and a sensing module 22. The light body 21 has a light source. The light source is usually disposed in the light body 21, and the light source is not shown in FIG. 4. An artisan of ordinary skill in the art will appreciate the design manner of the light source. The light source can be an LED light source, an incandescent light source or a fluorescent light source, but the present disclosure is not so restricted. In this embodiment, the sensing lamp 2 is a wall lamp, but the present disclosure is not so restricted. The light body 21 has a back plate 211 for connecting to the wall. In general, the power wires of the sensing lamp 2 are connected to the light source and the related circuit of the sensing module 22 through the back plate 211. The back plate 211 of the sensing lamp 2 in this embodiment does not include any exposed parameter adjusting element. This embodiment integrates the sensing module 22 with the control circuit and cooperates with the design of built-in parameter adjusting element of the sensing module 22, for simplifying the assembling of the wires and elements of the sensing lamp 2.

Figure 1A:
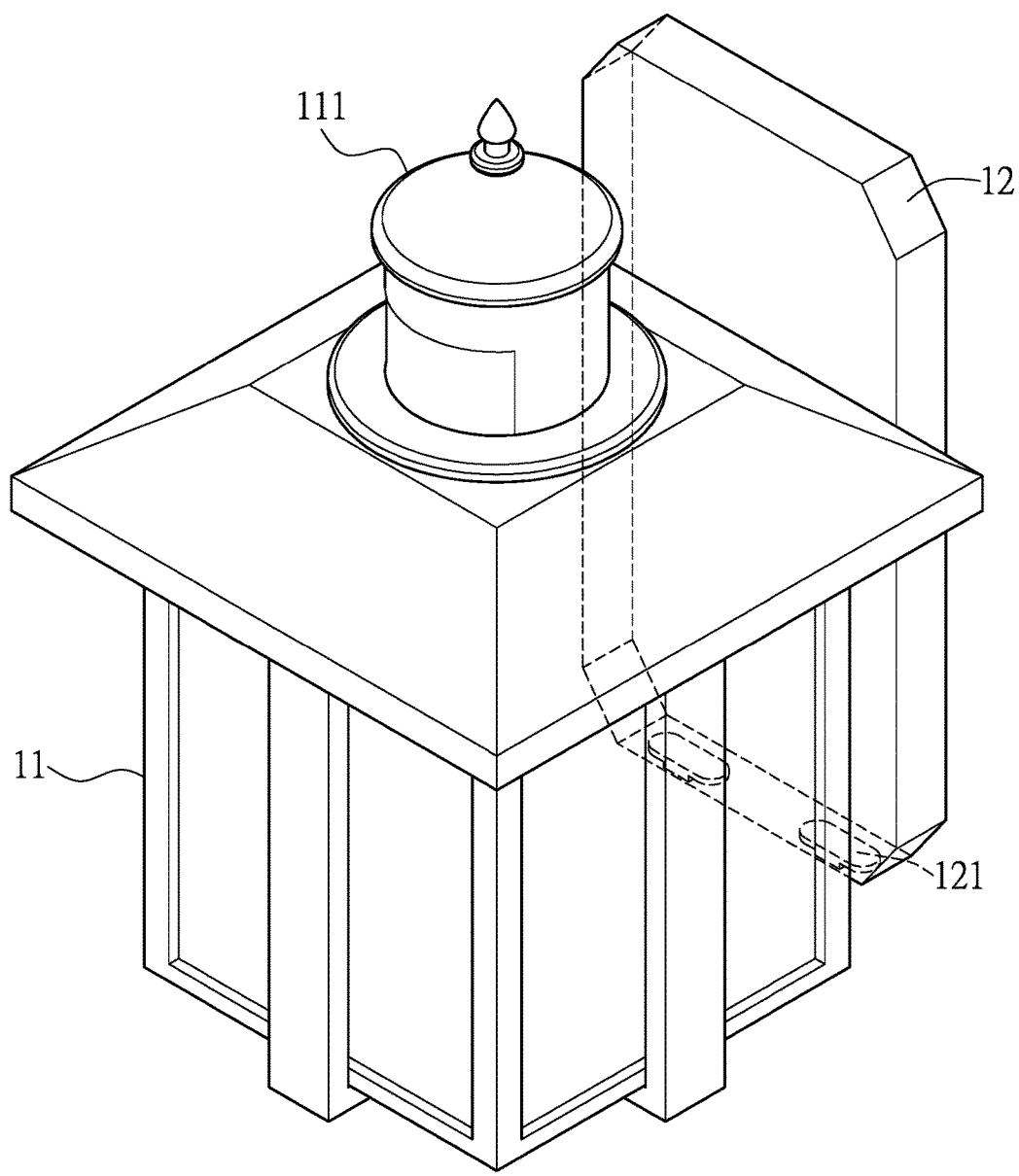
FIG. 1A shows a schematic diagram of a conventional sensing wall lamp.
Figure 1B:
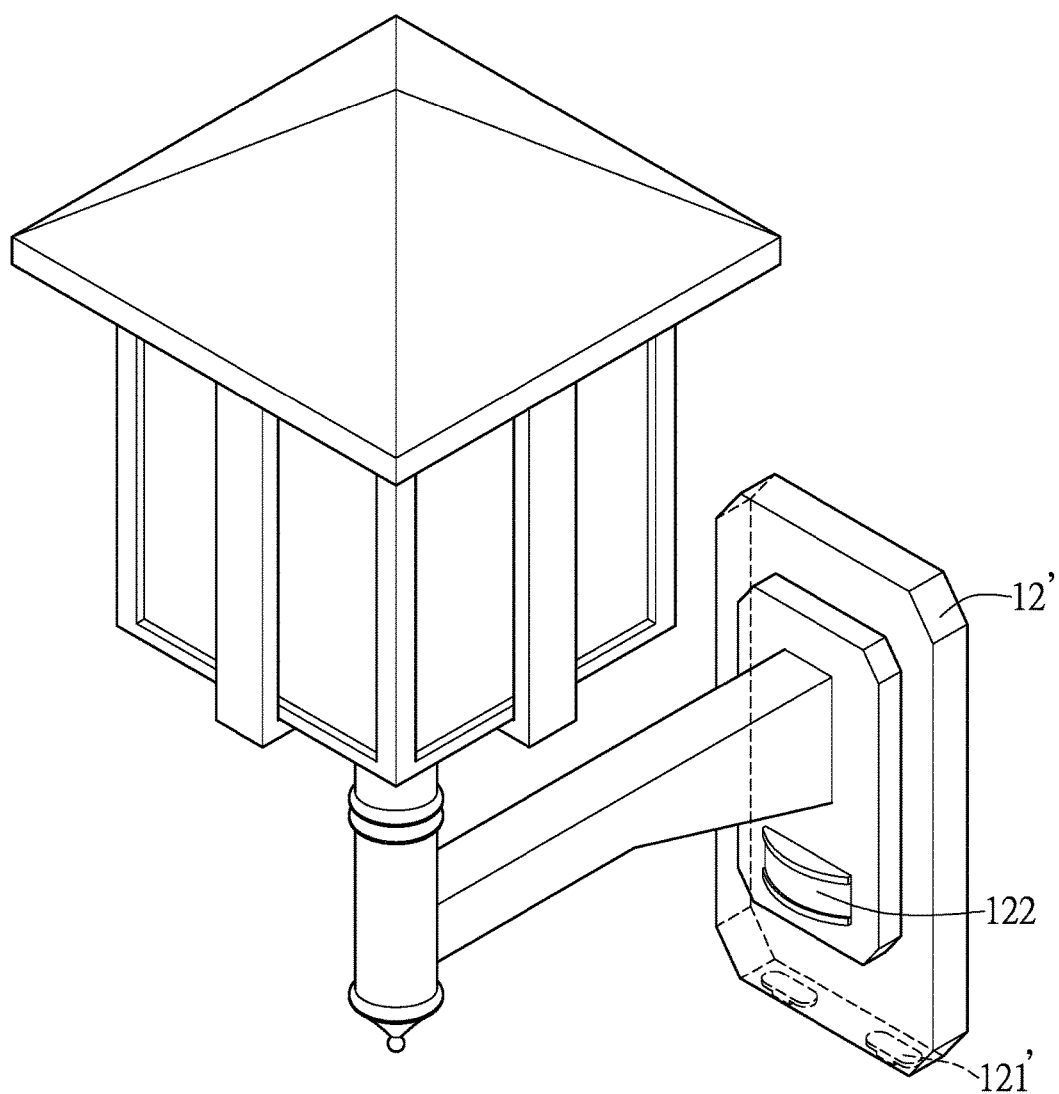
FIG. 1B shows a schematic diagram of a conventional sensing wall lamp.
Figure 2:
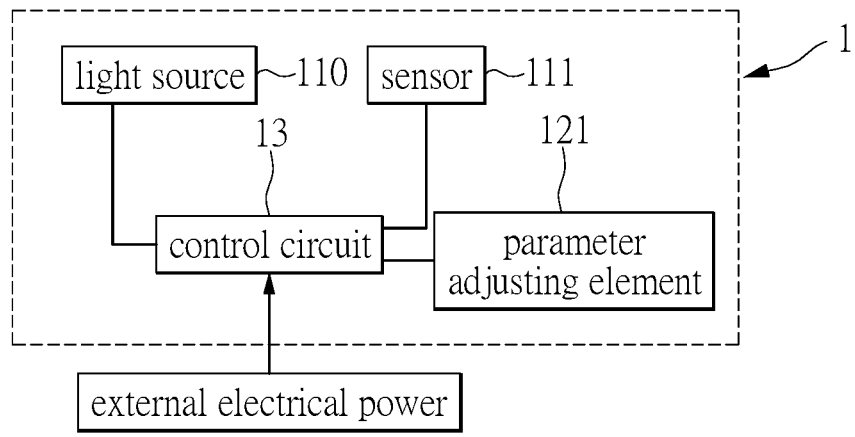
FIG. 2 shows a block diagram of a conventional sensing wall lamp.
Figure 2A:
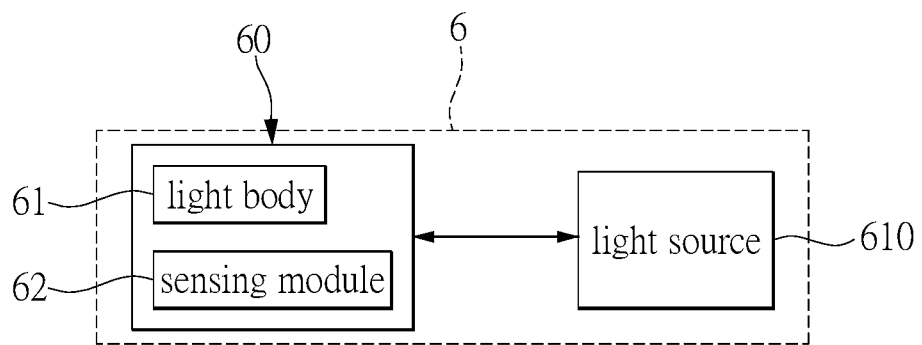
FIG. 2A shows a block diagram of a conventional sensing lamp.
Figure 5:
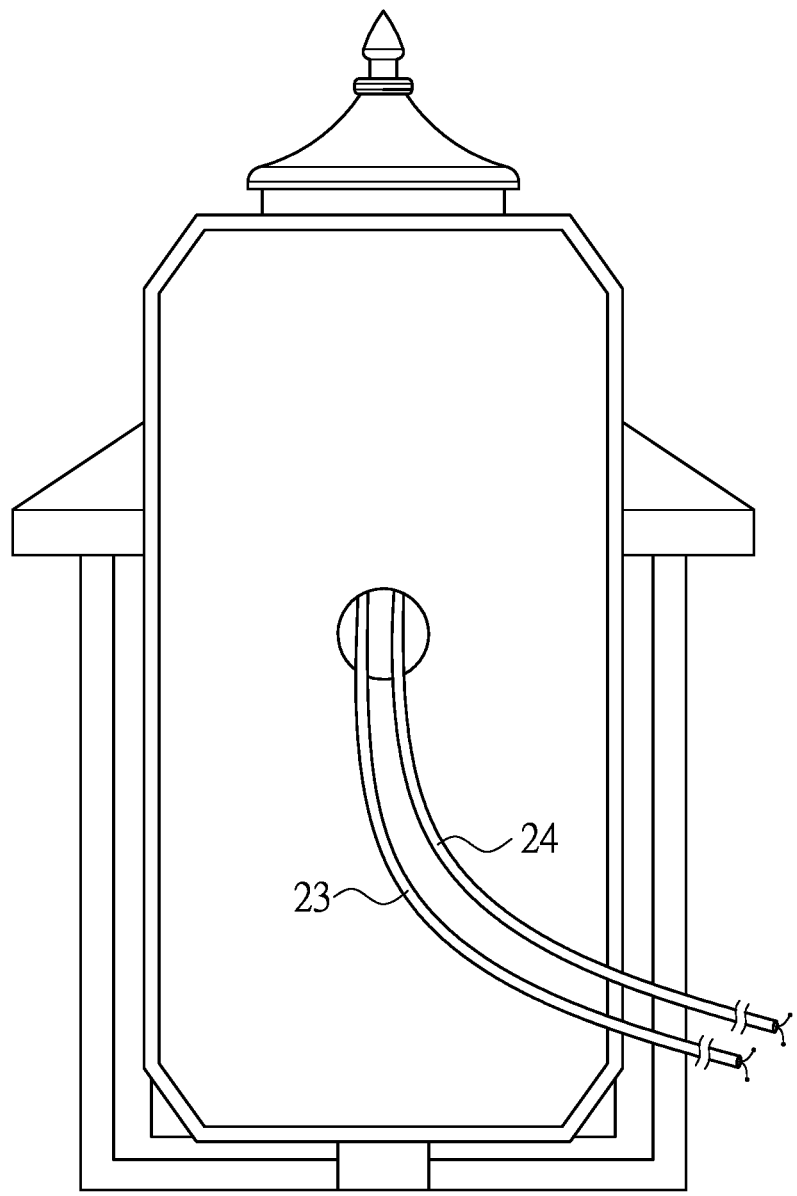
FIG. 5 shows a back view drawing of a sensing lamp according to an embodiment of the present disclosure.

Please refer to FIG. 5 showing a back view drawing of a sensing lamp according to an embodiment of the present disclosure. The sensing lamp 2 provides a user friendly way for adjustment and a more concise and aesthetic appearance (the parameter adjusting element is concealed). For example, the back plate 211 of the sensing lamp 2 can lead out the power wires 23 of the light source and the power wires 24 of the sensing module 22, and as such the wiring is simple. It only requires connecting these wires from the back plate to the exterior electrical power source or driving circuit. Therefore, by reducing the elements and the complexity of the wiring, the related cost of production of the lamp product and the probability of defects resulting during production process can be decreased. The back plate 211 is not required to be designed for cooperating with the wiring of the power wires, control wires, switches, or adjusting elements. As such, the design of the back plate can be more flexible. Basically, the back plate 211 can be designed according to the structure requirements without considering the sensing module 22. The complex design of the back plate 12 of the wall lamp 1 shown in FIG. 1 can be avoided. Further, in the subsequent embodiments, a sensing lamp without the back plate can also lead the power wires out of the light source and the sensing module, for achieving simplicity of the wiring.

Figure 3:
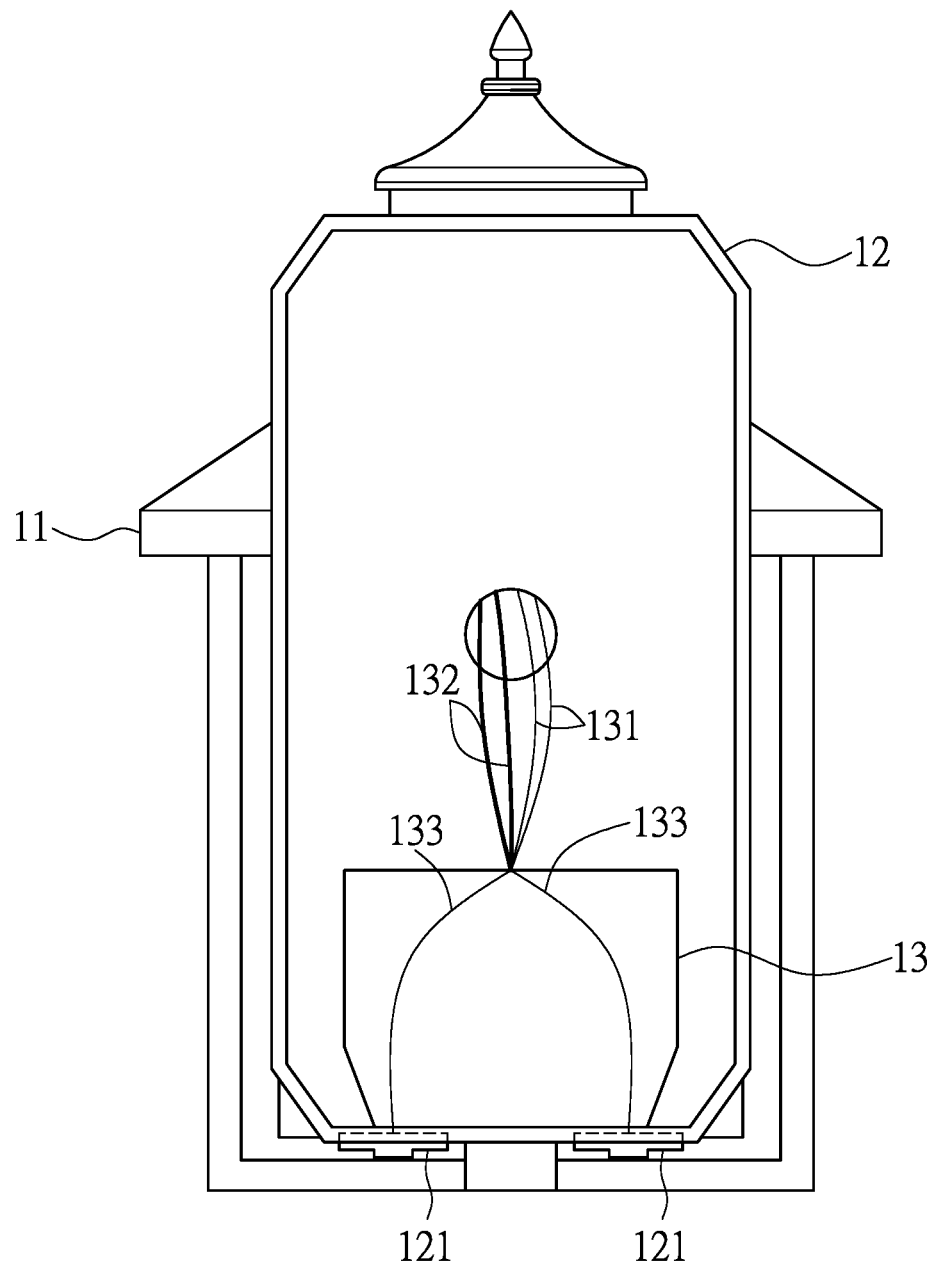
FIG. 3 shows a back view drawing of a conventional sensing wall lamp.

Please refer to FIG. 4 again. The sensing module 22 connects with the light body 21. As shown in FIG. 4, the sensing module 22 is disposed on the light body 21. However, in another embodiment, the sensing module 22 can be changed to connect with the bottom of the light body 21 or another position of the light body 21. Alternatively, the sensing module 22 can be disposed on the back plate (referred to subsequent embodiments). The location of the sensing module 22 can be changed according to practical applications (for example, the road lamp, the chandelier or the ceiling lamp), for the purpose of making the sensing module 22 be able to obtain the required sensing range, wherein the sensing range is determined in the design phase of the sensing light. In FIG. 4, the sensing module 22 comprises a sensing unit 221 and a cover 222. The sensing unit 221 has a sensor 2211, a control circuit 2212 and at least one parameter adjusting element 2213. The sensor 2211 and the parameter adjusting element 2213 are electrically coupled to the control circuit 2212. The control circuit 2212 of the sensing unit 221 is connected to an exterior electrical power source or a driving circuit (not shown in FIG. 4). The sensing unit 221 integrated with the conventional control circuit (referring to the control circuit 13 shown in FIG. 3) can be made on a single circuit board, in order to simplify the complexity of the circuit (or wiring). The sensing unit 221 shown in FIG. 4 is just an exemplary embodiment in order to describe the present disclosure in an understandable and clear way, but the structure of the sensing unit 221 is not so restricted.

A first side of the sensing unit 221 is provided with the sensor 2211. A second side of the sensing unit 221 is provided with the parameter adjusting element 2213. The sensing unit 221 can be an infrared sensing unit, a microwave sensing unit, a light sensing unit, or any combination thereof. However, this present disclosure does not limit the type of the sensing unit 221. The parameter adjusting element 2213 can be a slide switch, a knob . . . and so on, this present disclosure does not limit the type of the parameter adjusting element 2213. As shown in FIG. 4, in normal operation, the first side of the sensing unit 221 corresponds to the front side of the sensing lamp which is towards the +X direction. The second side of the sensing unit 221 corresponds to the back side of the sensing light which is towards the −X direction. However, the relative positions between the first side and the second can be changed according to the practical requirement of the design, and this shouldn't be a limitation to the present disclosure.

Figure 6:
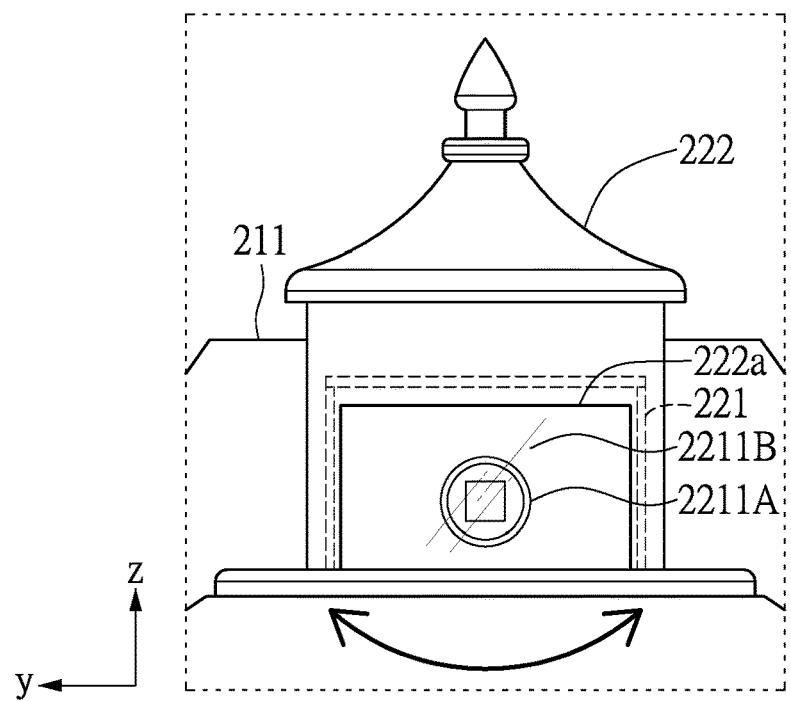
FIG. 6 shows a schematic diagram of a sensing lamp in normal status according to an embodiment of the present disclosure.
Figure 8:
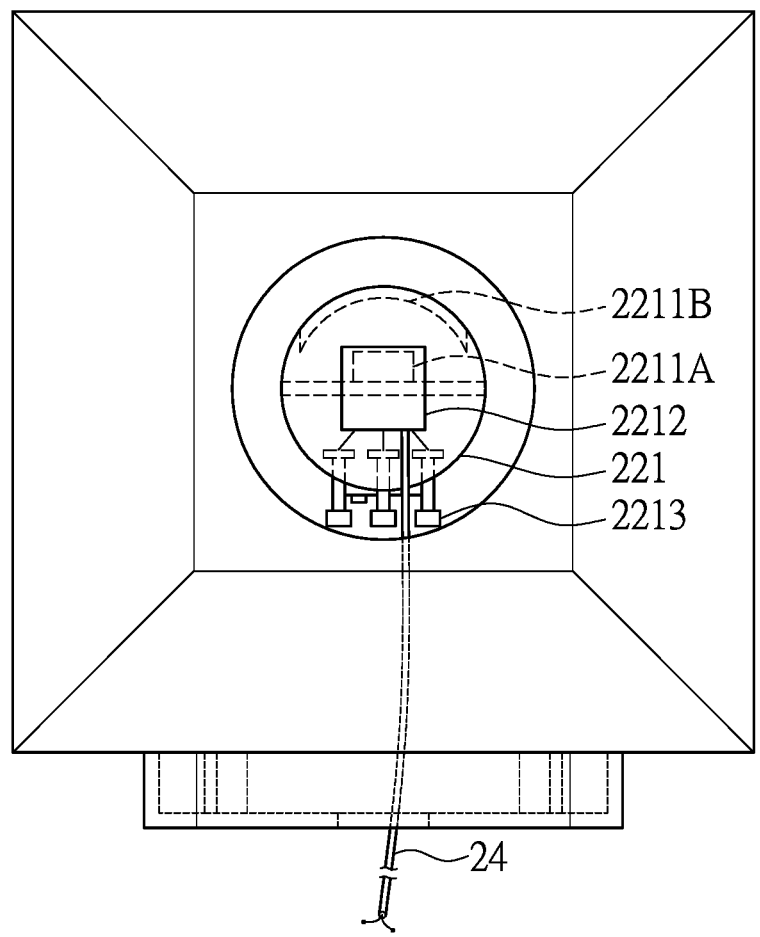
FIG. 8 shows a top view drawing of a sensing lamp according to an embodiment of the present disclosure.

Please refer to FIG. 6 in conjunction with FIG. 8. FIG. 6 shows a schematic diagram of a sensing lamp in normal status according to an embodiment of the present disclosure, and FIG. 8 shows a top view drawing of a sensing lamp according to an embodiment of the present disclosure. In FIG. 8, the cover 222 is removed, for ease of explanation and indication of the sensing unit 221. The control circuit 2212 is disposed in the sensing unit 221. The cover 222 partially covers the sensing unit 221. The cover 222 is combined with the light body 21 for partially covering the sensing unit 221. In this embodiment, an infrared sensing unit or a light sensing unit is taken as the example of the sensing unit 221, but the present disclosure is not so restricted. The sensor 2211 comprises at least one sensing element and a lens. For example, the sensor 2211 comprises at least one sensing element 2211A and a lens 2211B. The sensing element 2211A is electrically coupled to the control circuit 2212. The lens 2211B is disposed in front of the sensing element 2211A. The lens 2211B and the sensing element 2211A can be an integral structure. The material and the shape of the lens 2211B is not limited, and can be determined based on the type of the sensor. When the sensing unit 221 is an infrared sensing unit, the sensing element 2211A is an infrared sensing element, and the lens 2211B is an infrared lens. When the sensing unit 221 is a light sensing unit, the sensing element 2211A is a light sensing element, and the lens 2211B is a normal optical lens. In another embodiment, when the sensing unit 221 is a microwave sensing unit, the sensor 2211 is replaced by a microwave sensor comprising at least one microwave antenna, and the antenna is electrically coupled to the control circuit 2212, wherein the microwave sensor receives the microwave reflected by people (or object).

Corresponding to the sensor 2211, the cover 222 has an opening portion 222a. When the sensing unit 221 is rotated to a first angle, the sensor 2211 (especially the sensing element 2211A) corresponds to the opening portion 222a of the cover 222. In other words, the sensing element 2211A is behind the lens 2211B (when the sensing unit 221 is rotated to the first angle in normal operation). In normal operation, the sensing element 2211A receives sensing signals such as the exterior light, infrared or microwave reflections through the lens 2211B. The type of received sensing signal depends on the type of the sensor 2211 (or the sensing unit 221). At this time, the parameter adjusting element 2213 is at the back of the sensing unit 221.

Specifically, the sensing unit 221 and the light body 21 are rotatably connected. For example, the sensing unit 221 is connected to a rotation axis (and the rotation axis is connected to the light body), or the sensing unit 221 can be disposed on a rail on the light body 21. As such, the sensing unit 221 can rotate relative to the light body 21. In practical applications, a rotation angle limit is set to limit the sensing unit 221 rotating relative to the light body 21, in order to avoid breaking the power wires (such as the power wires 24 shown in FIG. 5) connecting the sensing unit 221 and the exterior electrical power source due to twisting the power wires when the rotation angle is too large.

As shown in FIG. 4, the sensing unit 221 can rotate about the Z axis, and the sensing unit 221 can rotate to a first angle and a second angle. However, this present disclosure does not limit the central axis which the sensing unit 221 rotates about to be the Z axis. The central axis about rotation can be changed to other directions. In this embodiment, the first angle corresponds to a normal operation status. As shown in FIG. 4, the Z axis is taken as the rotation central axis, and the first angle is towards the positive direction of the X axis (+X), such that the sensing unit 221 can sense signals such as the exterior light, infrared or microwave reflections through the lens 2211B. In one embodiment, for outdoor applications, when the sensing unit 221 is rotated to the first angle, the sensor 2211 and the cover 222 can further form an enclosed space to cover the control circuit 2212 and the parameter adjusting element 2213. Therefore, waterproof and dustproof efficacy can be achieved.

Figure 7:
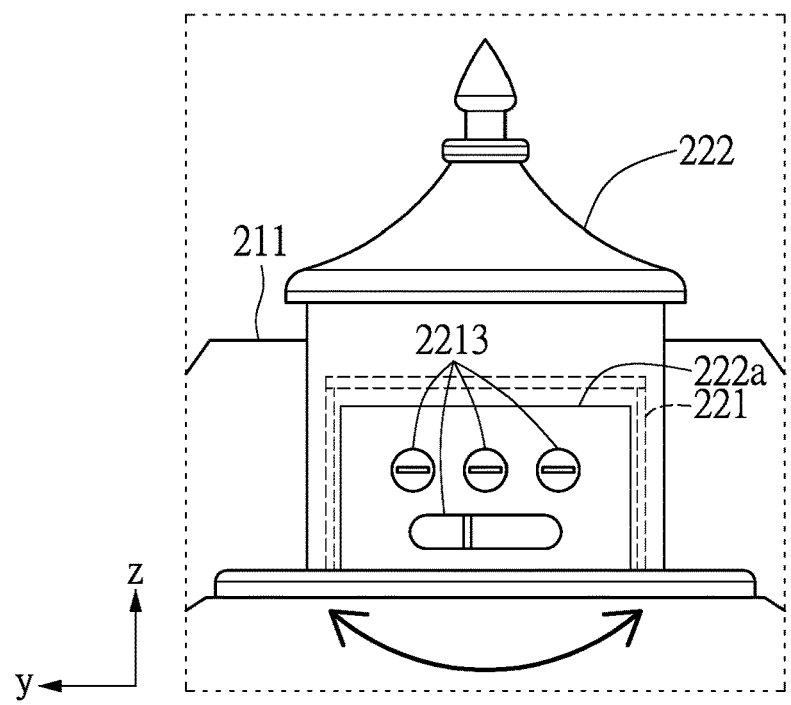
FIG. 7 shows a schematic diagram of a sensing lamp in adjustment status according to an embodiment of the present disclosure.

Please refer to FIG. 7 showing a schematic diagram of a sensing lamp in adjustment status according to an embodiment of the present disclosure. The second angle corresponds to an adjustment status. Consider the Z axis shown in FIG. 4 as the rotation central axis, and the second angle towards the negative direction of X axis (−X). When the sensing unit 221 is rotated to the second angle (towards −X), at least one parameter adjusting element 2213 is exposed, for the convenience of the user to manually adjust the parameter adjusting element 2213. At this time, because the sensing unit 221 is rotated to the second angle, the sensor 2211 (comprising the lens 2211B and the sensing element 2211A) is covered by the cover 222. In FIG. 7, as an exemplary embodiment, the shown parameter adjusting elements 2213 are three knobs and a slide switch.

In other words, when the sensing unit is rotated to the first angle (+X) which is for the normal operation status, the sensor 2211 at the first side of the sensing unit 221 is not covered by the cover 222. When the sensing unit 221 is rotated to the second angle (−X), the parameter adjusting element 2213 at the second side of the sensing unit 221 is not covered by the cover 222.

In practical applications, the first side can be the front-side (positive direction of the X axis shown in FIG. 4), the second side can be the back-side (negative direction of the X axis shown in FIG. 4), that is the sensor 2211 and the parameter adjusting element 2213 are respectively provided to the front-side and the back-side of the sensing unit 221. In the embodiment shown in FIG. 4, the difference between the first angle and the second angle can be 180 degrees, but the present disclosure is not so restricted. In another embodiment, the first side and the second side can be other than the front-side and the back-side respectively. Based on the design requirement, the angle difference between the first side and the second can be less than 180 degrees, for example the difference between the first angle and the second angle can be at least 90 degrees. That is, the difference between the first angle and the second angle can be varied or altered according to the practical requirement of the design. For example, the difference between the first angle and the second angle can be adjusted to an angle between 90 degrees and 180 degrees according to the practical requirement of the design. Alternatively, the difference between the first angle and the second angle can be less than 90 degrees.

Another Embodiment of the Sensing Lamp

Figure 9:
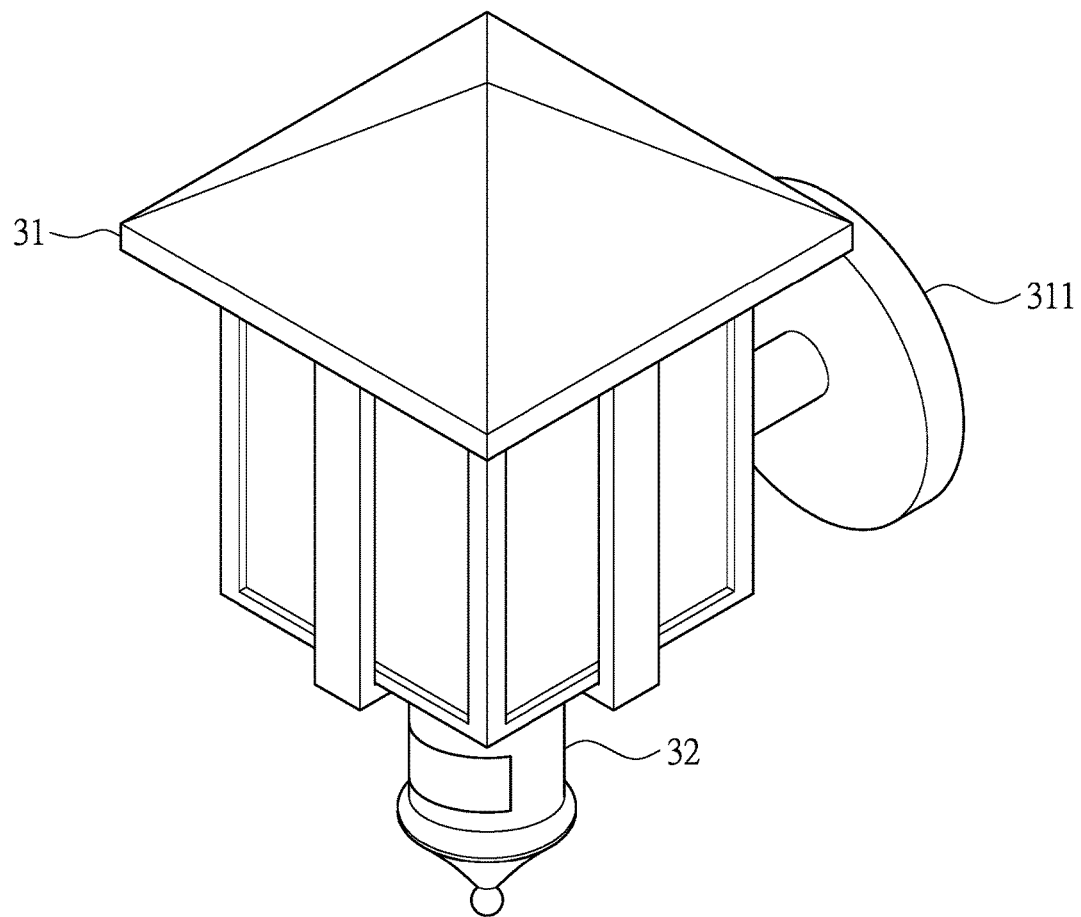
FIG. 9 shows a schematic diagram of a sensing lamp according to another embodiment of the present disclosure.

Please refer to FIG. 9 showing a schematic diagram of a sensing lamp according to another embodiment of the present disclosure. Compared to the embodiment shown in FIG. 4, the sensing module 32 of the sensing lamp 3 is changed to be connected to the bottom of the light body 31. Other components of the sensing lamp 3 are similar to the sensing lamp 2 shown in FIG. 4. For example, the difference between the back plate 311 and the back plate 211 shown in FIG. 4 is only that the shape of the back plate is different, that is to say that the back plate of the sensing lamp 3 can be arbitrarily changed according to practical applications. The sensing module 32 can comprise an infrared sensing unit, a microwave sensing unit, a light sensing unit, or any combination thereof, but the present disclosure is not so restricted. The sensing module 32 of the sensing lamp 3 is regarded as placing the sensing module 22 of FIG. 4 upside down, and the structure and the circuit function of the sensing module 32 are identical to those of the sensing module 22, thus the redundant information is not repeated.

Another Embodiment of the Sensing Lamp

Figure 10:
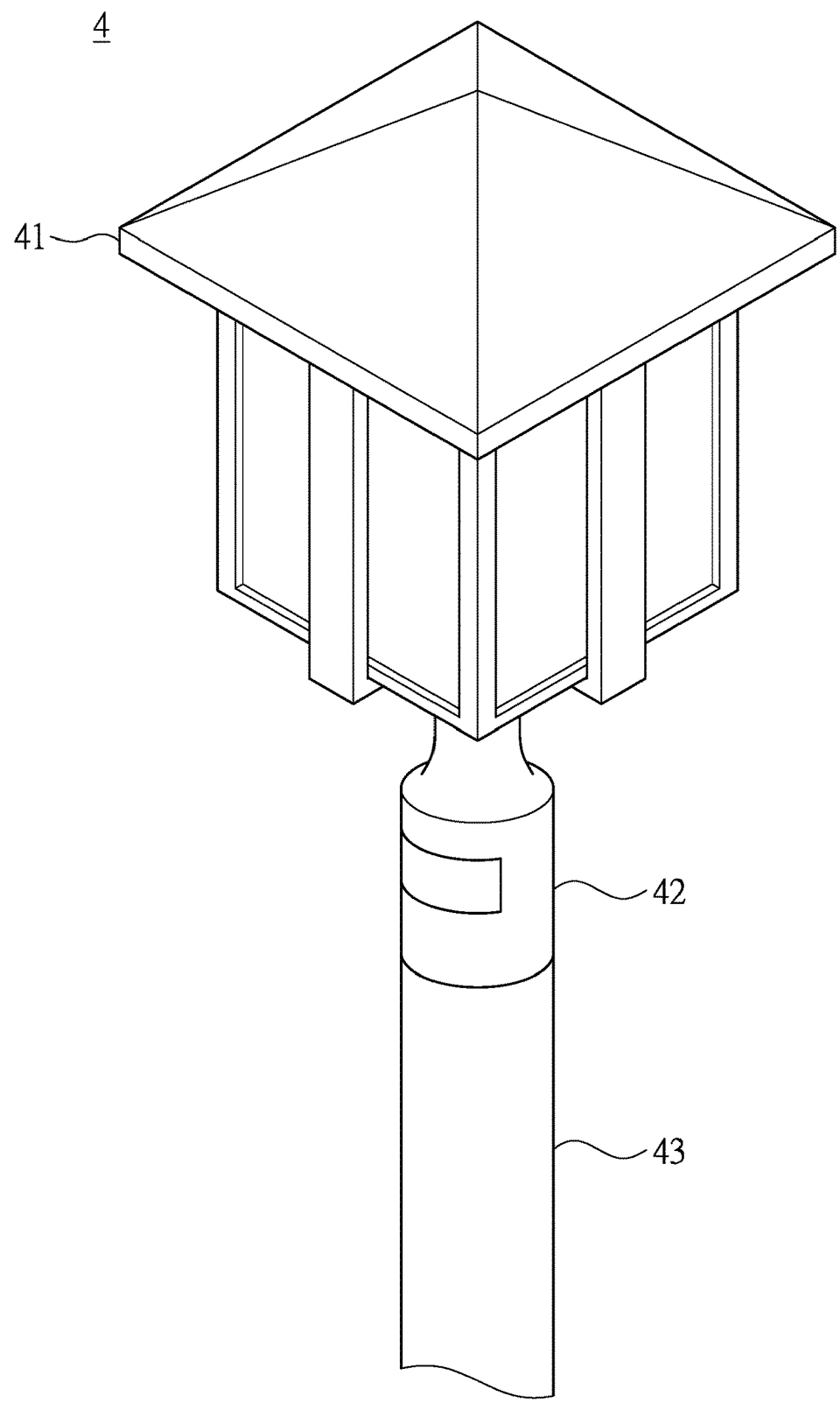
FIG. 10 shows a schematic diagram of a sensing lamp according to another embodiment of the present disclosure.

Please refer to FIG. 10 showing a schematic diagram of a sensing lamp according to another embodiment of the present disclosure. Compared to the embodiment shown in FIG. 9, the sensing module 42 of the sensing lamp 4 is also arranged at the bottom of the light body 41. However, compared to the sensing lamp 3 shown in FIG. 9, the sensing lamp 4 in FIG. 10 is a roadside lamp 4. Thus, the back plate is removed, and a supporting pole 43 is added. Other components of the sensing lamp 4 are similar to those of the sensing lamp 2 shown in FIG. 4. The sensing module 42 can comprise an infrared sensing unit, a microwave sensing unit, a light sensing unit, or any combination thereof, but the present disclosure is not so restricted. The sensing module 42 of the sensing lamp 4 is regarded as placing the sensing module 22 of FIG. 4 at a proper position, and the structure and the circuit function of the sensing module 42 are identical to those of the sensing module 22, thus the redundant information is not repeated. In another one embodiment, when the type of application of the sensing lamp 4 is changed, for example a chandelier, ceiling lamp or other lamp, the position and the detecting direction (angle or range) of the sensing module can be changed according to the requirement. In short, the present disclosure does not limit the type of the sensing module, the appearance of the sensing module and the position of the sensing module. Also, the present disclosure does not limit the sensing angle or range of the sensing module.

Another Embodiment of the Sensing Lamp

Figure 11:
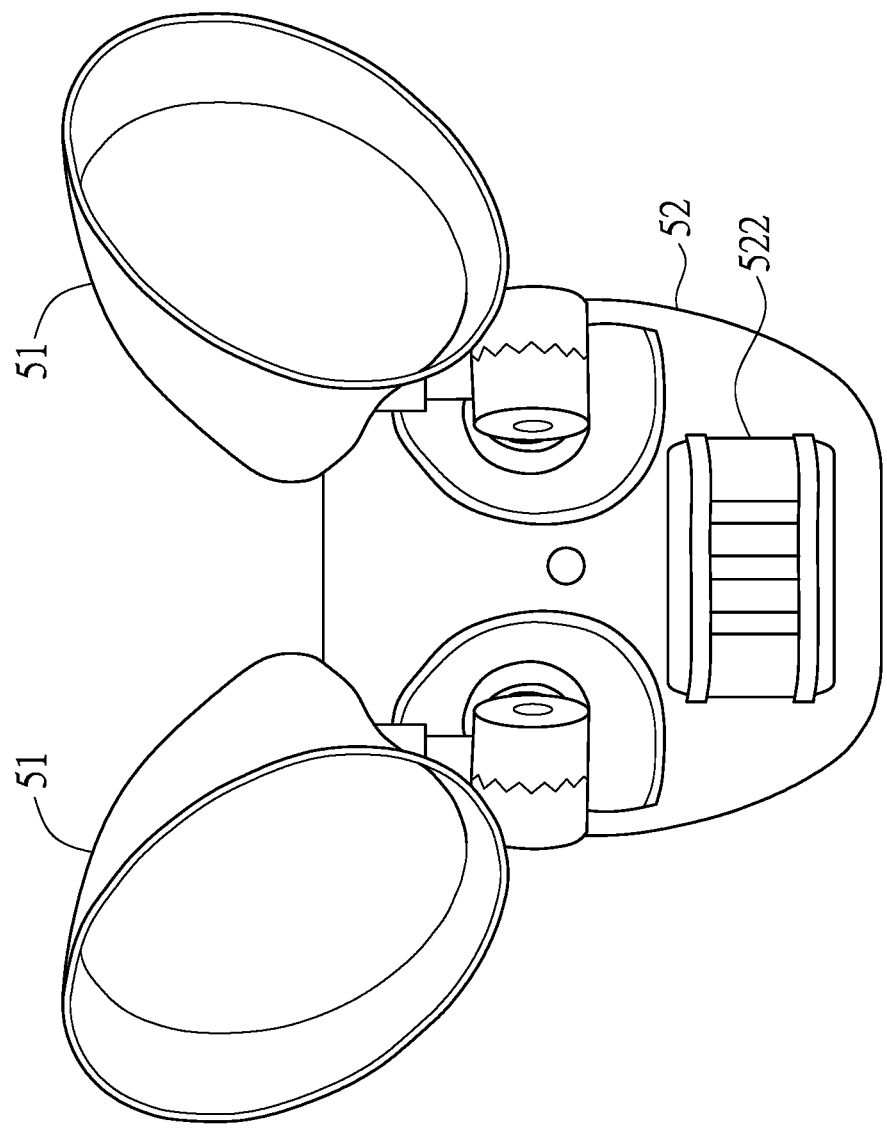
FIG. 11 shows a schematic diagram of a sensing lamp according to another embodiment of the present disclosure.

Please refer to FIG. 11 showing a schematic diagram of a sensing lamp according to another embodiment of the present disclosure. The sensing module 522 is not disposed on the light body 51, but on the back plate 52. In other words, the major difference between the sensing lamp 5 and the previous embodiments is the sensing module 522 is disposed on the back plate 52. The sensing unit (not shown in FIG. 11, referring to the sensing unit 221 shown in FIG. 4) of the sensing module 522 rotatably connects to the back plate 52. Additionally, the sensing lamp 5 shown in FIG. 11 comprises two light bodies 51, but the appearance of the sensing lamp 5 is not for restricting the scope of the present disclosure. The sensing module 522 can comprise an infrared sensing unit, a microwave sensing unit, a light sensing unit, or any combination thereof, but the present disclosure is not so restricted. The design concept of the sensing module 522 is identical to that of the sensing module 22, that is to say the design concept of the parameter adjusting element of the sensing module 522 is identical to the parameter adjusting element 2213 of the previous embodiment, thus the redundant information is not repeated.

According to above descriptions, the provided sensing lamp integrates the sensor and the control circuit into the sensing module. As such, the wiring layout is simple, the arrangement of control wires or power wires is simplified, and the related cost of production of the lamp product and the probability of defects resulting during production process can be reduced. The sensing lamp is provided with user friendly way for adjustment and more concise and aesthetic appearance (the parameter adjusting element is concealed). By utilizing the rotatable sensing unit of the sensing lamp, the user can easily rotate the sensing unit to an angle (the second angle) adapted for operating the parameter adjusting element(s), so as to adjust the related parameter of the sensing unit. After the adjustment is finished, the sensing unit can return to the normal operation angle (first angle). Because the back plate of the sensing lamp is not restricted to incorporate the parameter adjusting element(s), the design flexibility is significantly increased when considering the back plate to match the aesthetic appearance of the overall light body.

An Embodiment of the Sensing Module

Figure 12A:
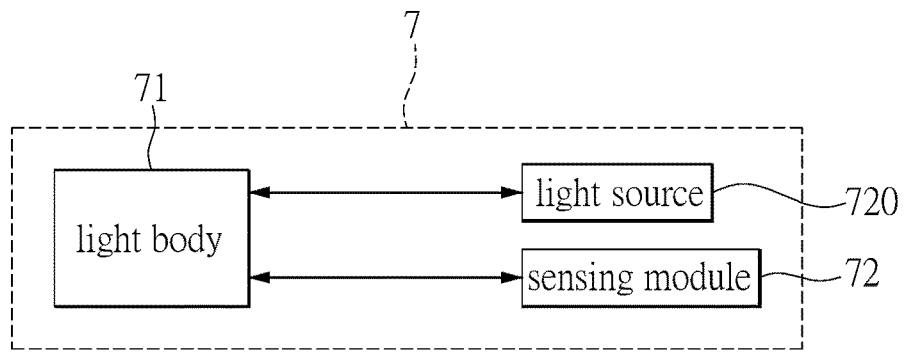
FIG. 12A shows a schematic detachability diagram of a sensing module with a sensing lamp according to another embodiment of the present disclosure.
Figure 13A:
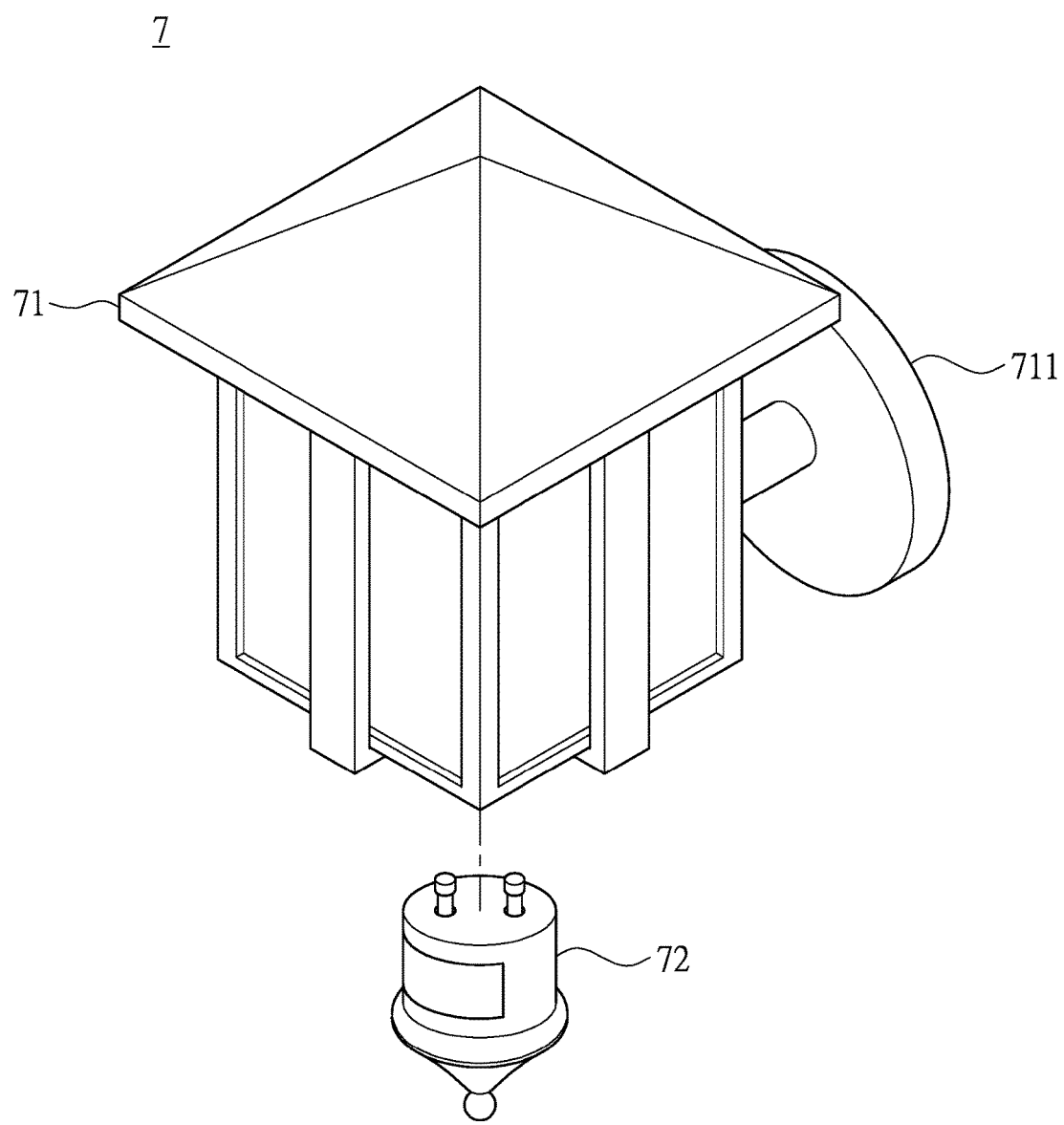
FIG. 13A shows an assembled view of the sensing module with a sensing lamp according to FIG. 12A of the present disclosure.
Figure 13B:
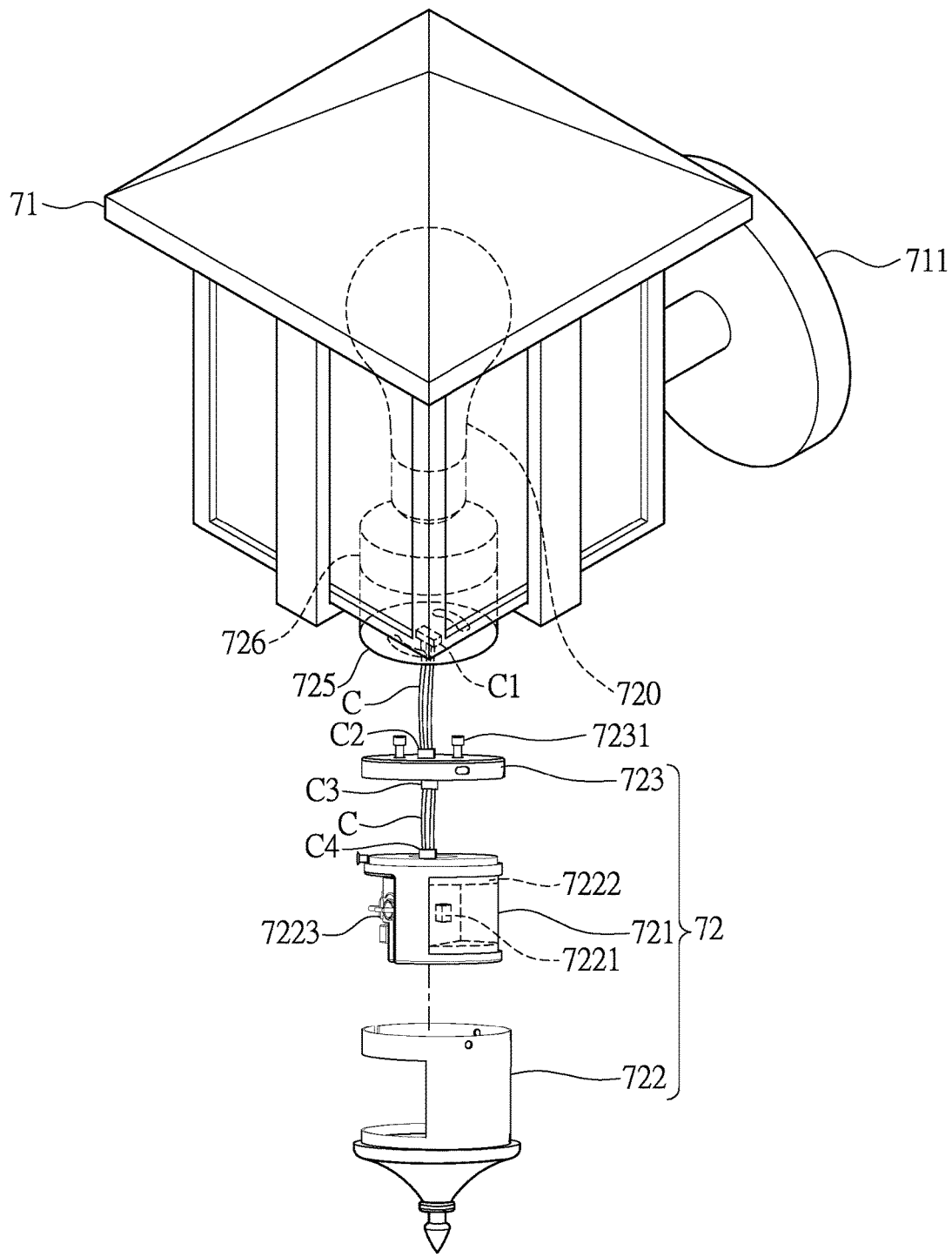
FIG. 13B shows an exploded view of the sensing module with a sensing lamp according to FIG. 12A of the present disclosure.

Please refer to FIGS. 12A, 13A and 13B, which show a schematic detachability diagram, an assembled view and an exploded view of a sensing module of a sensing lamp 7 according to another embodiment of the present disclosure. The sensing lamp 7 includes a light body 71, a sensing module 72 and a light source 710. The light body 71 is fixed on the wall by a back plate 711. The sensing module 72 is detachably connected to the light body 71 to selectively turn on the light source 720. According to this diagram, both the sensing module 72 and light source 720 can be detachably and independently attached on the sensing lamp 7. As shown in FIG. 13B, the sensing module 72 includes a sensing unit 721 and a connecting module 723. A holder connector 725 is a corresponding element in the light body 71. The sensing unit 721 has at least one sensor 7221, a control circuit 7222 and at least one parameter adjusting element 7223. The sensing unit 721 and the bottom cover perform the similar functions as described in the previous disclosure. The sensor 7221 can be a microwave sensor. The parameter adjusting element 7223 can be used to adjust illumination characteristics of light source, such as a light intensity, a timer, and a sensor sensitivity . . . etc. The at least one sensor 7221 and the at least one parameter adjusting element 7223 are electrically coupled to the control circuit 7222. A first side of the sensing unit 721 is provided with the sensor 7221. A second side of the sensing unit 721 is provided with the parameter adjusting element 7223. The control circuit 7222 is disposed in the sensing unit 721.

The connecting module has a pair of electrodes 7231 that can be detachably inserted and locked into a corresponding receptacle in the light body 71. When electrodes 7231 are attached to light body 71, the sensing unit 721 receives the power supply from the power source of the light body 71 through the electrodes 7231. The electrodes 7231 are electrically connected to the sensing unit 721. The sensing module 72 is detachably connected with the light body 71 via the connecting module 723 and the holder connector 725. The electrodes 7231 are electrically coupled with the light body 71 when the connecting module is connected with the light body 71.

Refer to FIG. 13B. A socket connector 726 is disposed in the light body 71, which can be an E27 type lamp socket in this embodiment. The connecting module 723 and the holder connector 725 allow the sensing module 72 electrically connecting with the light body 71.

In this embodiment, the holder connector 725 is fixed in the light body 71 and the connecting module is a rotatory plunger is electrically coupled to the sensor 7211. The rotatory plunger is connected to the sensing unit 721. The electrodes 7231 are provided with the rotatory plunger. For example, in this embodiment, the rotatory plunger can be a bi-pin connector, a screw socket or a GU24 connector. The bi-pin connector, sometimes referred to as two-pin, bipin cap or bipin socket, is a standard from the IEC (International Electrotechnical Commission) for lamp fittings. These are used on many small incandescent light bulbs (especially halogen lamps), and for starters on some types of fluorescent lights as well, such as a GU10 twist-lock base. The screw socket, or referred to as Edison screw (ES), is a standard socket for light bulbs, such as E14 or E27 screw base. GU24 connector is fitting for compact fluorescent light bulbs (CFL) or LED bulbs that use a bayonet mount-like twist-lock bi-pin connector instead of the Edison screw fitting used on many incandescent light bulbs.

This embodiment further includes a cable C between the sensing unit 721 and the holder connector 725. The cable C passes through the rotatory plunger 723. The cable C can include a ground wire, a power wire, a zero cross detection wire and a control-driving wire. However, the present disclosure is not limited thereto, for example the cable C can be replaced by connecters, such as connecter C1 and connecter C2 without cable, or connecter C3 and connecter C4 without cable. Each connector can have a plurality of pins, such as ground pin, a power pin, a zero cross detection pin and a control-driving pin.

The sensing module 72 further includes a cover 722 partially covers the sensing unit 721. The sensing unit 721 and the light body 71 are rotatably connected, so that the sensing unit 721 is capable of rotating to a first angle and a second angle. The sensor 7211 at the first side of the sensing unit 7211 is not covered by the cover 722 when the sensing unit 721 is rotated to the first angle. The parameter adjusting element 7223 at the second side of the sensing unit 721 is not covered by the cover 722 when the sensing unit 721 is rotated to the second angle.

Another Embodiment of the Sensing Module

Figure 12B:
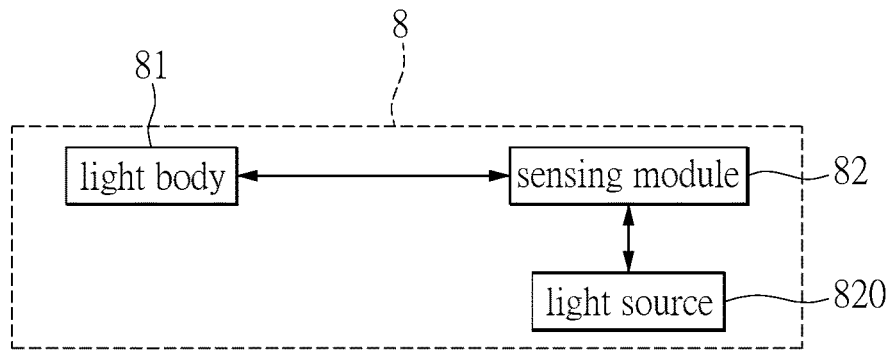
FIG. 12B shows a schematic detachability diagram of a sensing module with a sensing lamp according to another embodiment of the present disclosure.
Figure 14:
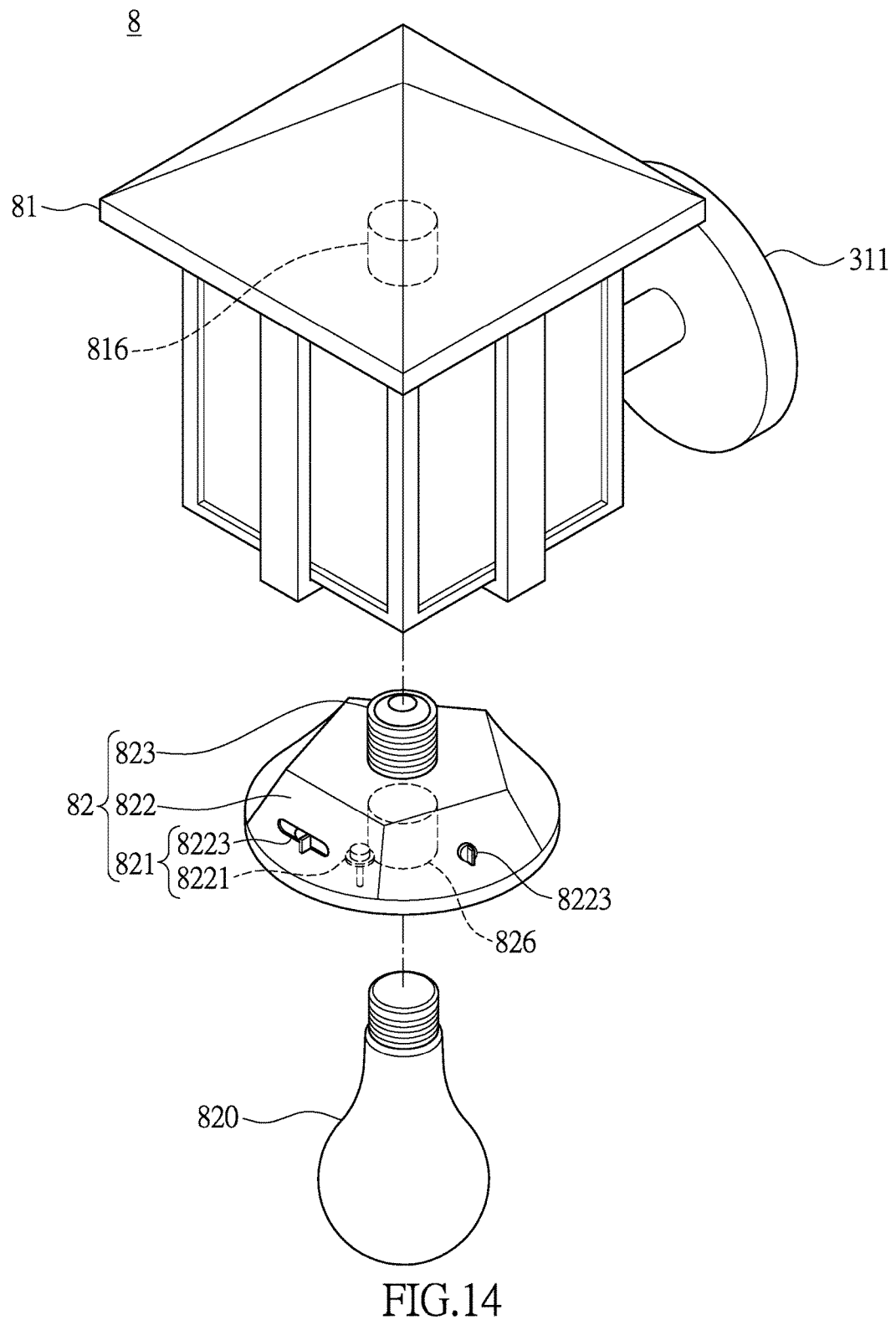
FIG. 14 shows an exploded view of the sensing module with a sensing lamp according to FIG. 12B of the present disclosure.

Please refer to FIG. 12B and FIG. 14, which show a schematic detachability diagram and an exploded view of a sensing module of a sensing lamp 8 according to another embodiment of the present disclosure. A sensing module is detachably connectable to a light body 81. The sensing lamp 8 includes a light body 81, a sensing module 82 and a light source 820. According to this diagram, the light source 820 can be detachably attached to the sensing module 82. The sensing module 82 is further detachably attached to the sensing lamp 8.

Please refer to FIG. 14 showing the detail implementation of FIG. 12B. The sensing module 82 performs the same function as that of sensing module 72 in FIG. 12A. The difference is that the housing 822 has a screw-in base on the top and a screw-in socket in the bottom. The screw-in base and the screw-in socket allow the sensing module 82 to make both electrical and mechanical connections when being attached to the light body 81 and the light source 820 through the corresponding screw-in base and the screw-in socket.

The sensing module 82 includes a sensing unit 821, and a housing 822 to receive the sensing unit 821. The sensing unit 821 includes at least one sensor 8211 which can be a microwave sensor, a control circuit (inside the housing 822) and at least one parameter adjusting element 8223. The sensor 8211 and the parameter adjusting element 8223 electrically coupled to the control circuit. The light source 820 is capable to be turned on by the sensing unit 82 selectively. The sensing module 82 is detachable connected to the light body 81 by a first holder connector 816, and the light source 820 is detachable connected to the sensing module 82 by a second holder connector 826. The holder connectors (816, 826) can be a bi-pin connector, a screw-in socket or a GU24 connector.

A connecting module 823 is electrically coupled with the sensing unit 821 and fixed above the sensing unit 821. In this embodiment, the connecting module 823 is fixed on a top of the housing 822. The connecting module 823 allows the sensing module 82 electrically connectable with the light body 81. The connecting module 823 can be detachably fixed in the light body 81. The connecting module 823 can be screw-in base, a bi-pin base or a GU24 base.

Another Embodiment of the Sensing Module

Figure 12C:
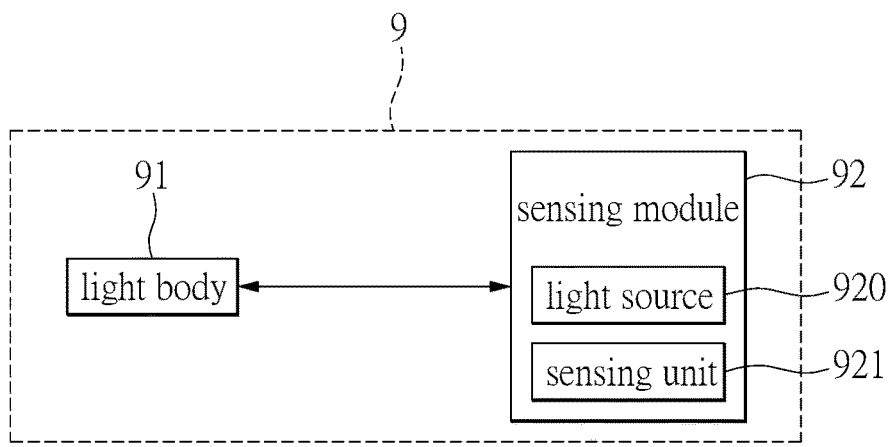
FIG. 12C shows a schematic detachability diagram of a sensing module with a sensing lamp according to another embodiment of the present disclosure.
Figure 15:
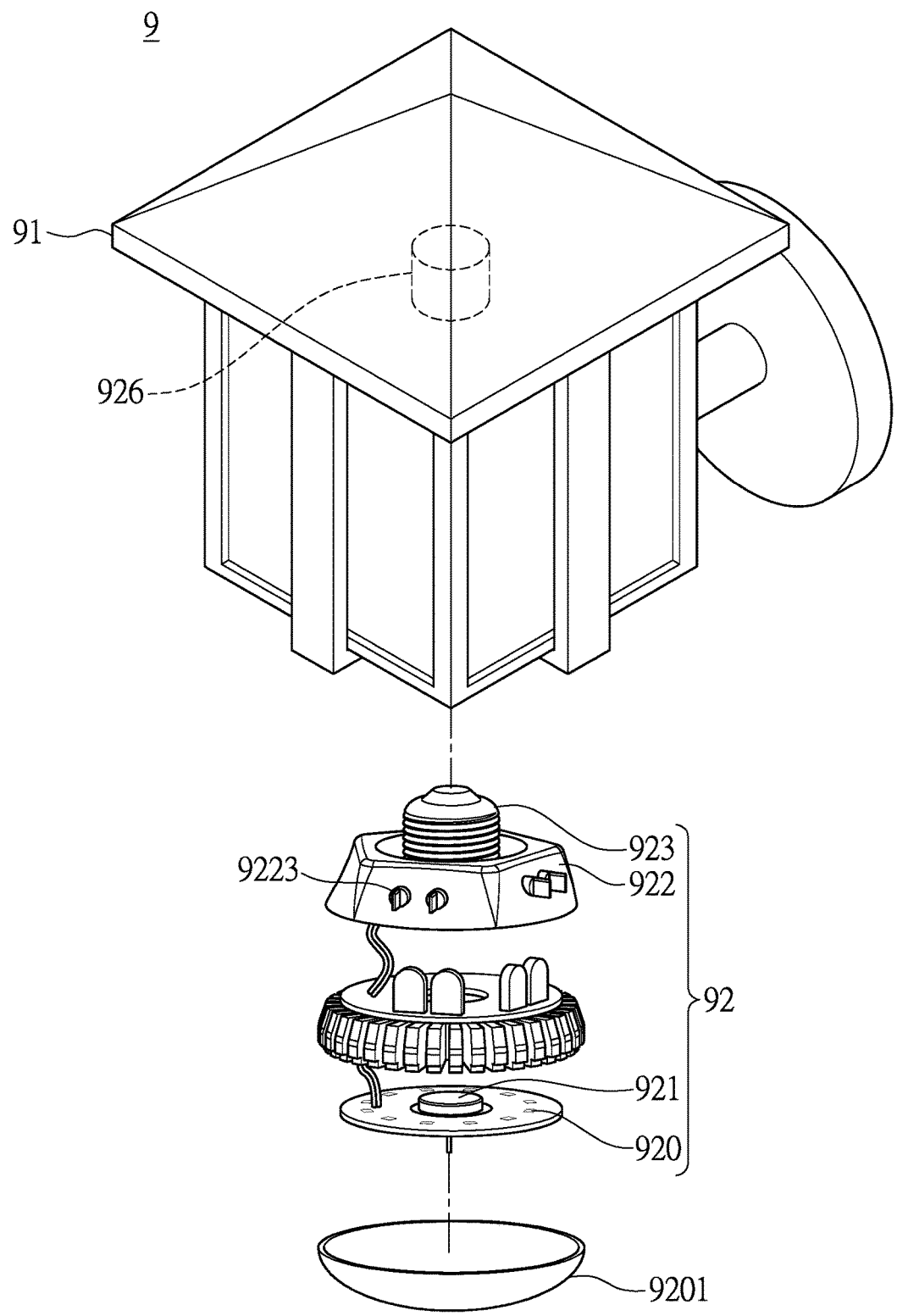
FIG. 15 shows an exploded view of the sensing module with a sensing lamp according to FIG. 12C of the present disclosure.

Please refer to FIG. 12C and FIG. 15, which show a schematic detachability diagram and an exploded view of a sensing module of a sensing lamp 9 according to another embodiment of the present disclosure. FIG. 15 showing the detail implementation of FIG. 12D. The sensing lamp 9 includes a light body 91 and a sensing module 92. The sensing module 92 includes a light source 920 and a sensing unit 921. According to this diagram, the sensing module 92 can be detachably attached to the sensing lamp 9 using similar structure described in the previous embodiment of FIG. 14.

The difference of the sensing module 92 from the sensing module 82 in the FIG. 14 is that the sensing module 92 further integrates the light source 920 in the sensing module. With all components including sensing unit, comprehensive parameter adjustments as well as the light source integrated in one module and further is detachably connectable to a light body through a screw-in base make this sensing module user friendly, applicable to most of decoration lantern and cost economic. The light source 920 is a LED light. The sensing unit 921 is disposed on a bottom surface of the LED light. The light source 920 is either detachably or non-detachably connected under the housing 922.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A sensing module, being detachably connected to a light body to selectively turn on a light source, the sensing module comprising:
a sensing unit, having at least one sensor, a control circuit and at least one parameter adjusting element, the at least one sensor and the at least one parameter adjusting element being electrically coupled to the control circuit, the control circuit being disposed in the sensing unit; and
an electrical connector, having one side electrically and mechanically connected with the sensing unit, and another side detachably and independently connected to the light body in an electrical and mechanical manner,
wherein a first side of the sensing unit is provided with the at least one sensor, and a second side of the sensing unit is provided with the at least one parameter adjusting element; wherein the second side of the sensing unit is opposite to the first side of the sensing unit; and
wherein the sensing module further comprises a cover partially covering the sensing unit, wherein the sensing unit is capable of rotating to a first angle and a second angle, wherein the at least one sensor at the first side of the sensing unit is not blocked and is capable of performing sensing function when the sensing unit is rotated to the first angle, wherein the at least one parameter adjusting element at the second side of the sensing unit is exposed to being adjusted when the sensing unit is rotated to the second angle.

2. The sensing module according to claim 1, wherein the electrical connector further comprising a connecting base disposed on the top side of the electrical connector, wherein the electrical connector allows the sensing module electrically connecting with the light body.

3. The connecting module according to claim 2, wherein the connector base is a screw-in base, a bi-pin base or a GU24 base.

4. The sensing module according to claim 1, wherein the sensing module further comprises a holder connector disposed at the bottom side of the sensing module opposite to the electrical connector; wherein the holder connector allows a light source electrically connecting to the sensing module.

5. The connecting module according to claim 4, wherein the holder connector is a screw-in base, a bi-pin base or a GU24 socket.

6. The sensing module according to claim 1, wherein the electrical connector further comprising a cable, wherein the cable is electrically coupled between the light body and the sensing module.

7. The sensing module according to claim 6, wherein the cable includes power wires.

8. The sensing module according to claim 1, wherein the sensor is a microwave sensor.

9. A sensing module, being connected to a light body to selectively turn on a light source, the sensing module comprising:
a sensing unit, having at least one sensor, a control circuit and at least one parameter adjusting element, the at least one sensor and the at least one parameter adjusting element being electrically coupled to the control circuit, the control circuit being disposed in the sensing unit;
wherein a first side of the sensing unit is provided with the at least one sensor, a second side of the sensing unit is provided with the at least one parameter adjusting element; wherein the second side of the sensing unit is opposite to the first side of the sensing unit;
wherein the sensing module further comprises a cover partially covering the sensing unit,
wherein the sensing unit is capable of rotating to a first angle and a second angle, the at least one sensor at the first side of the sensing unit is not blocked and is capable of performing sensing function when the sensing unit is rotated to the first angle, the at least one parameter adjusting element at the second side of the sensing unit is exposed to being adjusted when the sensing unit is rotated to the second angle.

10. The sensing module according to claim 9, wherein the sensor module further comprise an electrical connector electrically and mechanically connected with the sensing unit; wherein the connector enables the sensing module being detachably connectable to the light body.

11. A sensing lamp, comprising:
a light body;
a sensing module, for detecting a motion intrusion, the sensing module being connected to the light body, wherein the sensing module includes:
  a sensing unit, having at least one sensor, a control circuit and at least one parameter adjusting element electrically coupled to the control circuit; wherein a first side of the sensing unit is provided with the at least one sensor, wherein a second side of the sensing unit is provided with the at least one parameter adjusting element, wherein the control circuit is disposed in the sensing unit; wherein the second side of the sensing unit is opposite to the first side of the sensing unit; and
  a cover, partially covering the sensing unit;
wherein the sensing unit is capable of rotating to a first angle and a second angle, wherein the at least one sensor at the first side of the sensing unit is not blocked and is capable of performing sensing function when the sensing unit is rotated to the first angle, wherein the at least one parameter adjusting element at the second side of the sensing unit is exposed to being adjusted when the sensing unit is rotated to the second angle.

12. The sensing lamp according to claim 11, wherein the cover is not rotatable against the light body; wherein the cover is configured with one opening in the front such that when the sensing unit is rotated to the first angle, the sensor is not covered by the cover while the parameter adjusting element is covered by the cover.

13. The sensing lamp according to claim 11, wherein the cover is rotatable against the light body in conjunction with the sensing unit; wherein when the sensing unit is rotated to the first angle, the sensor is able to perform a motion detection function, wherein when the sensing unit is rotated to the second angle, the at least one parameter adjustment element is exposed such that a barrier free environment is created for making an adjustment of at least one operating parameter of the sensing lamp.

14. The sensing lamp according to claim 13, wherein the at least one parameter adjusting element is further covered by an openable device, such that when the sensing unit is rotated to the first angle, the parameter adjusting element is well protected by the openable device against any external damage; and when the sensing unit is rotated to the second angle, the openable device is removable for making adjustment of at least one operating parameter of the sensing lamp.

15. The sensing lamp according to claim 11, wherein the sensing unit is further integrated with an electrical connector, wherein the electrical connector provides electrical and mechanical connections between the sensing unit and the light body of the sensing lamp, wherein the electrical connector is configured with an detachable arrangement to enable to electrically and mechanically detach the sensing unit from the light body of the sensing lamp.

* * * * *